(12) United States Patent
Zhou (10) Patent No.: US 8,804,369 B2
(45) Date of Patent: Aug. 12, 2014

(54) PERIPHERAL COMPONENT INTERCONNECT CARD FASTENING DEVICE

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 177 days.

(21) Appl. No.: 13/368,522

(22) Filed: Feb. 8, 2012

(65) Prior Publication Data

US 2013/0050965 A1    Feb. 28, 2013

(30) Foreign Application Priority Data

Aug. 30, 2011 (CN) .......................... 2011 1 0252850

(51) Int. Cl.
*H05K 7/02* (2006.01)
*H05K 7/04* (2006.01)
*H05K 7/14* (2006.01)
*H05K 7/18* (2006.01)
*H05K 5/00* (2006.01)
*H05K 7/00* (2006.01)
*G06F 1/16* (2006.01)

(52) U.S. Cl.
USPC ........... 361/801; 361/807; 361/798; 361/754; 361/759; 361/679.31; 361/679.32; 361/679.4; 361/679.6; 361/679.57; 361/679.58

(58) Field of Classification Search
USPC ............ 361/759, 807, 798, 754, 801, 679.31, 361/679.32, 679.4, 679.45, 679.6, 679.57, 361/679.58
See application file for complete search history.

(56) References Cited

U.S. PATENT DOCUMENTS

| | | | |
|---|---|---|---|
| 5,673,175 A * | 9/1997 | Carney et al. ............ | 361/679.58 |
| 6,185,106 B1 * | 2/2001 | Mueller ..................... | 361/798 |
| 6,618,264 B2 * | 9/2003 | Megason et al. ............ | 361/759 |

* cited by examiner

*Primary Examiner* — Anthony Haughton
*Assistant Examiner* — Zhengfu Feng
(74) *Attorney, Agent, or Firm* — Novak Druce Connolly Bove + Quigg LLP (57) ABSTRACT

A PCI card fastening device for fastening a PCI card to a chassis includes a latching plate fixed to the PCI card, a latching element slidably fixed to the chassis and a locking element. The latching element includes a latching hole and a latching portion. The locking element is rotatably fixed to the latching element, the locking element includes a pressing board and a hook, the hook includes a securing block. The latching plate is latched to the latching portion, the securing block is latched in the latching hole to latch the locking element to the latching element. After the securing block is released from the latching hole, the pressing board moves away from the latching element to release the latching plate between the pressing arm and the latching element.

16 Claims, 8 Drawing Sheets

PERIPHERAL COMPONENT INTERCONNECT CARD FASTENING DEVICE

BACKGROUND

1. Technical Field

This disclosure relates to peripheral component interconnect card fastening devices, particularly to a peripheral component interconnect card fastening device for a server.

2. Description of Related Art

A peripheral component interconnect (PCI) card of a server may be releasably inserted into a slot of a motherboard of the server. However, the connection between the PCI card and the motherboard relies only on the friction force between the connector and the mass storage devices. Such a PCI card may very easily be separated from the motherboard if the server is moved.

To avoid the PCI card accidently unfastening or falling from the motherboard during the transportation of the server, a way of fixing the PCI card to the motherboard is by a fastener, such as a nut and bolt. However, this way is not at all expedient because a supplemental fastener must be dealt with when the PCI card is assembled to the motherboard or detached from the motherboard.

Therefore, there is a room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary peripheral component interconnect card fastening device. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
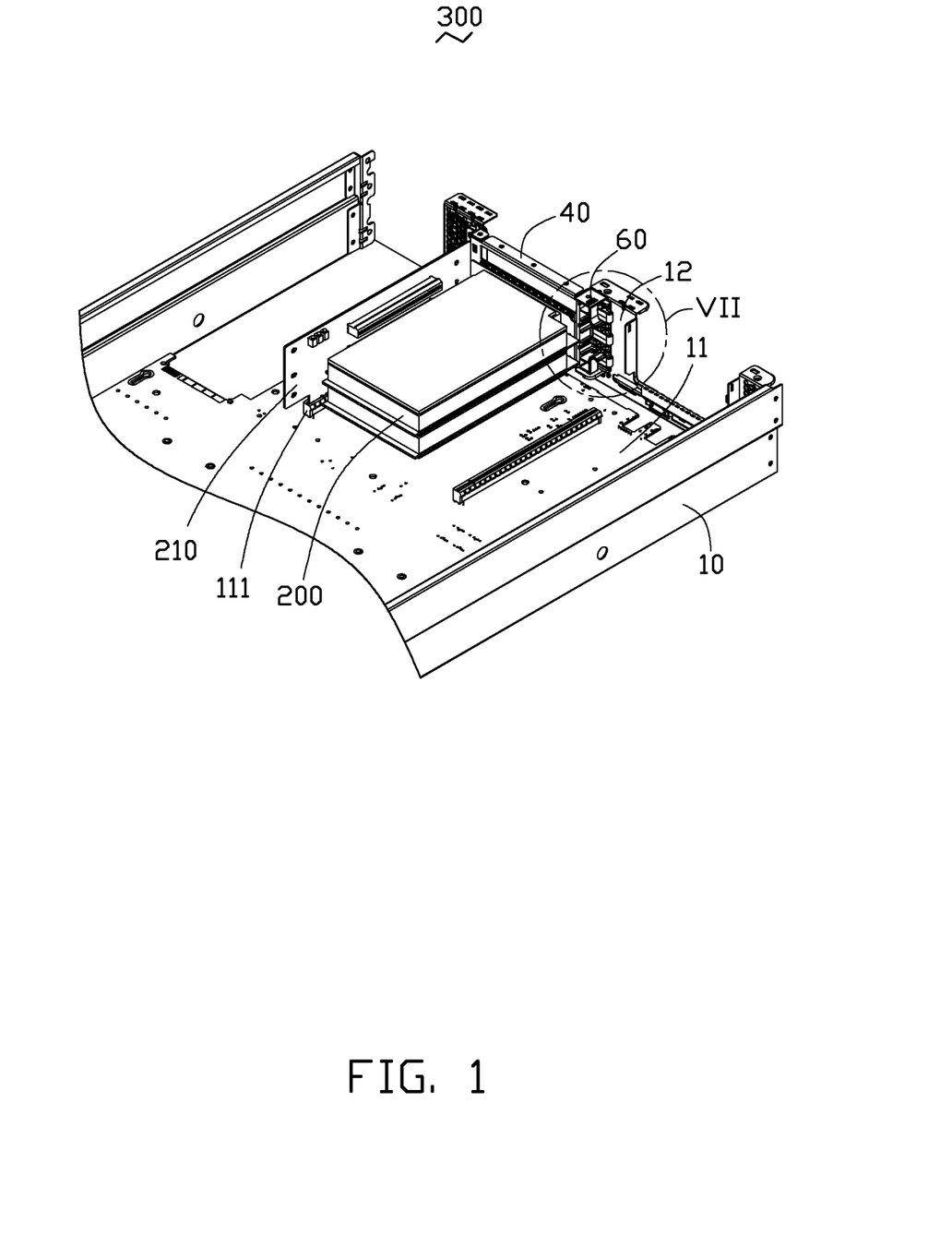
FIG. 1 is an exploded view of an exemplary peripheral component interconnect card fastening device.
Figure 2:
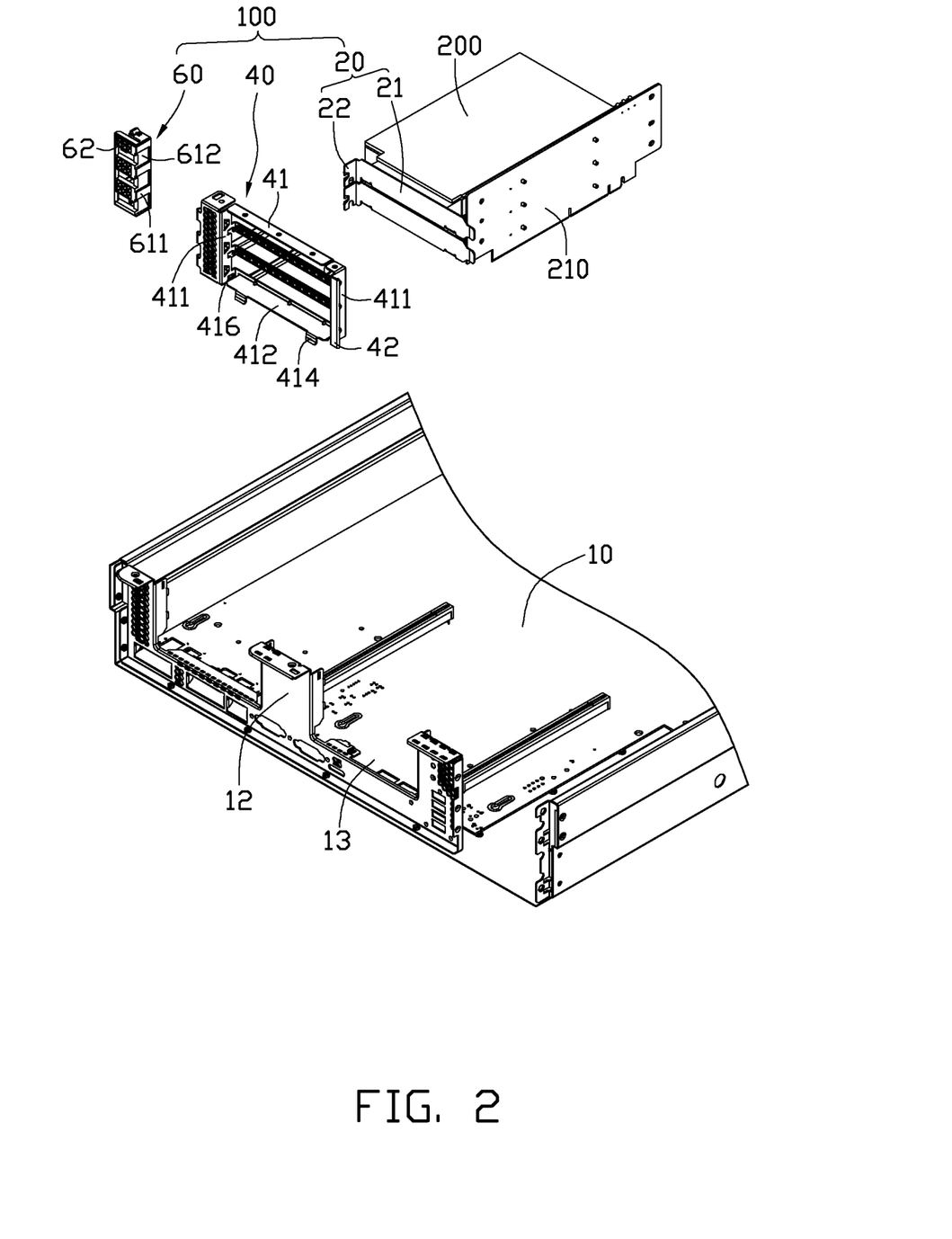
FIG. 2 is an exploded view of the peripheral component interconnect card fastening device of FIG. 1.

Referring to FIGS. 1 and 2, an exemplary embodiment of a server 300 includes a chassis 10, a motherboard 210, a plurality of peripheral component interconnect (PCI) cards 200 and a peripheral component interconnect (PCI) card fastening device 100. The motherboard 210 is fixed to the chassis 10, the PCI cards 200 are insertable into the motherboard 210. The fastening device 100 is used to position, stabilize, and fix the PCI cards 200 to the chassis 10 to prevent the PCI cards 200 from moving relative to the motherboard 210.

Figure 3:
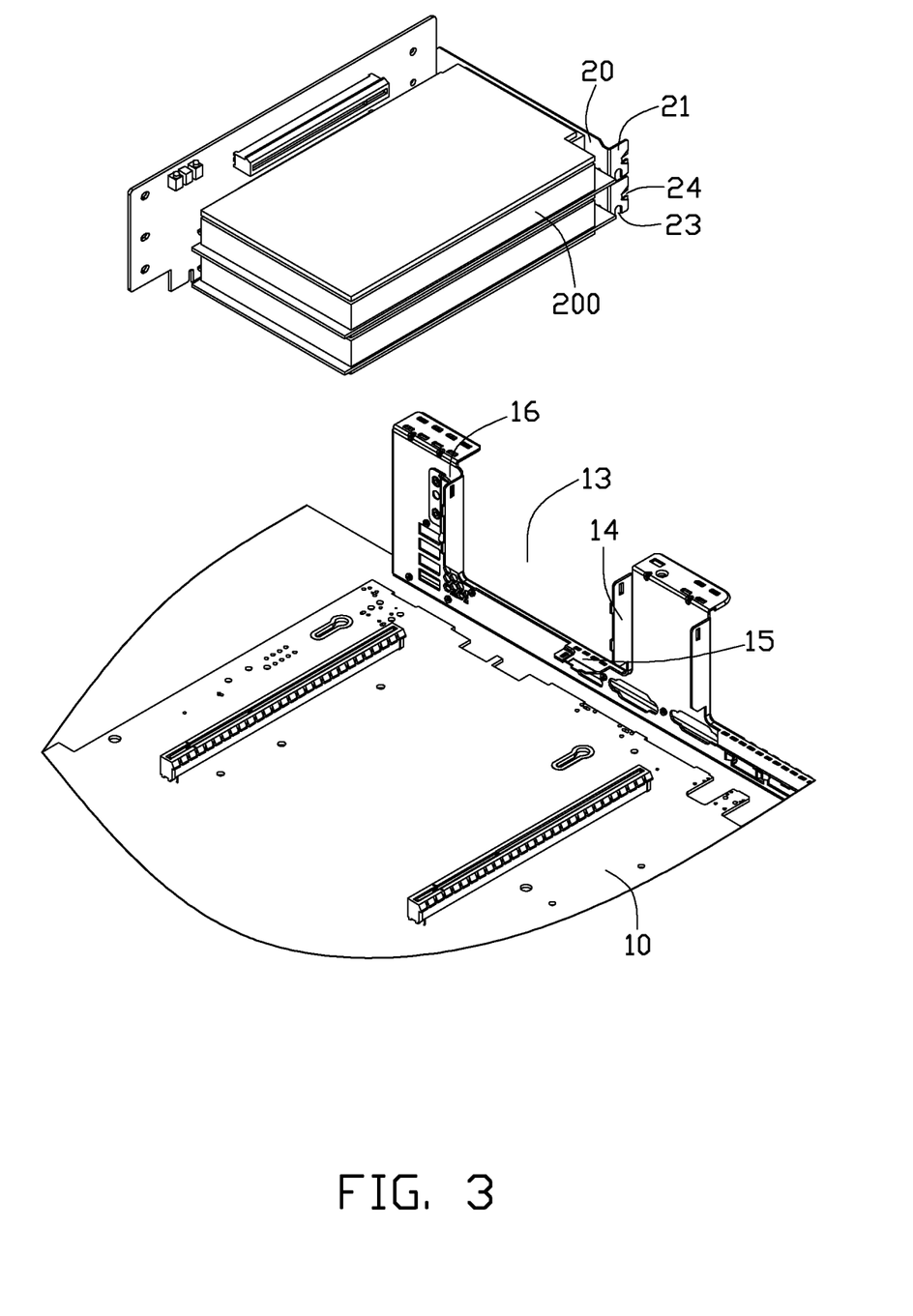
FIG. 3 is an exploded view of the peripheral component interconnect card fastening device of FIG. 1 viewed from another aspect.

Referring to FIG. 3, the chassis 10 includes a main board 11, and an end wall 12 protruding from the main board 11. A socket 111 is defined in the main board 11, into which the motherboard 210 is inserted. The end wall 12 defines a notch 13. Two opposite supporting plates 14 and a resisting plate 15 protrude from the end wall 12 surrounding the notch 13. The supporting plates 14 are at two sides of the notch 13, and the resisting plate 15 is located at an end of the notch 13 adjacent to the main board 11. The end wall 12 further defines a sliding groove 16 adjacent to one of the supporting plates 14.

The fastening device 100 includes a plurality of latching plates 20, a latching element 40 and a locking element 60.

Each latching plate 20 is substantially L-shaped, and includes a latching section 21 and a bending section 22 from the latching section 21. Each latching section 21 latches with one of the PCI cards 200. Each bending section 22 defines a first latching groove 23 and a second latching groove 24 perpendicular to the first latching groove 23.

Figure 4:
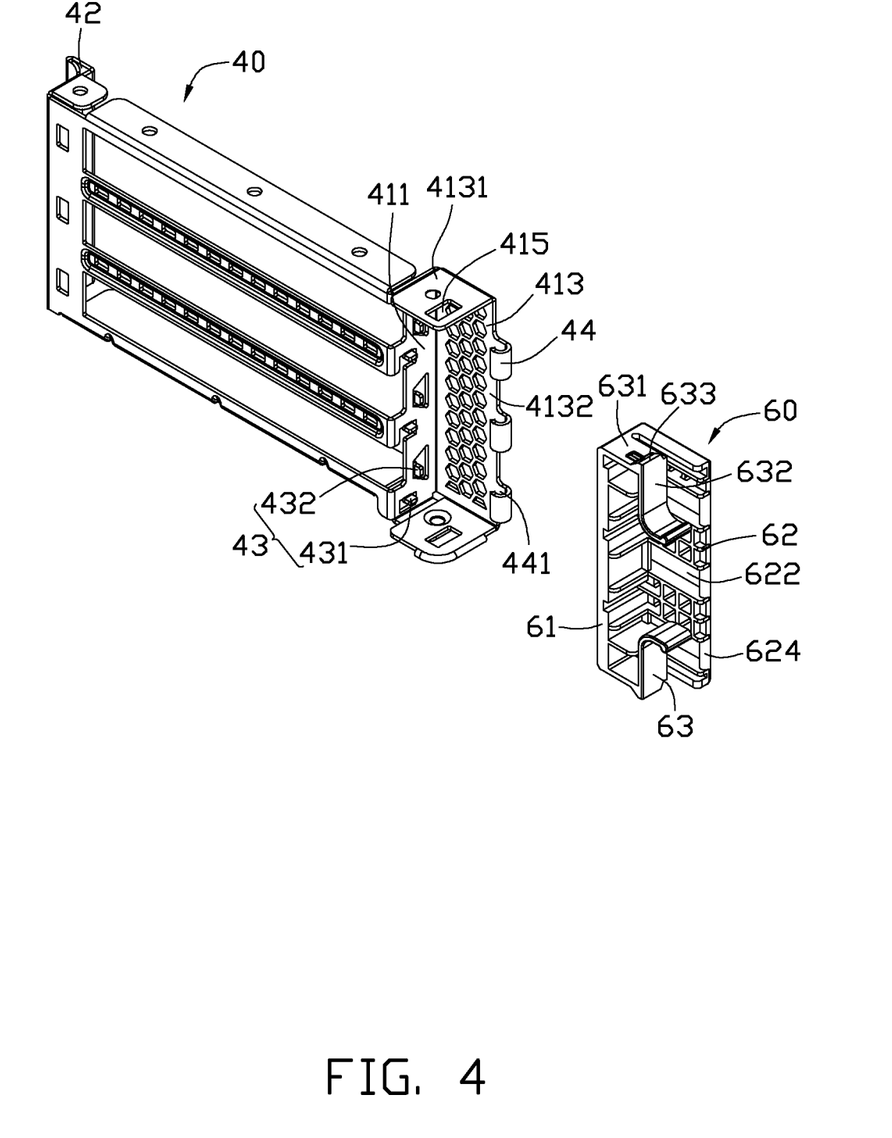
FIG. 4 is a partially enlarged view of the peripheral component interconnect fastening device of FIG. 2.
Figure 5:
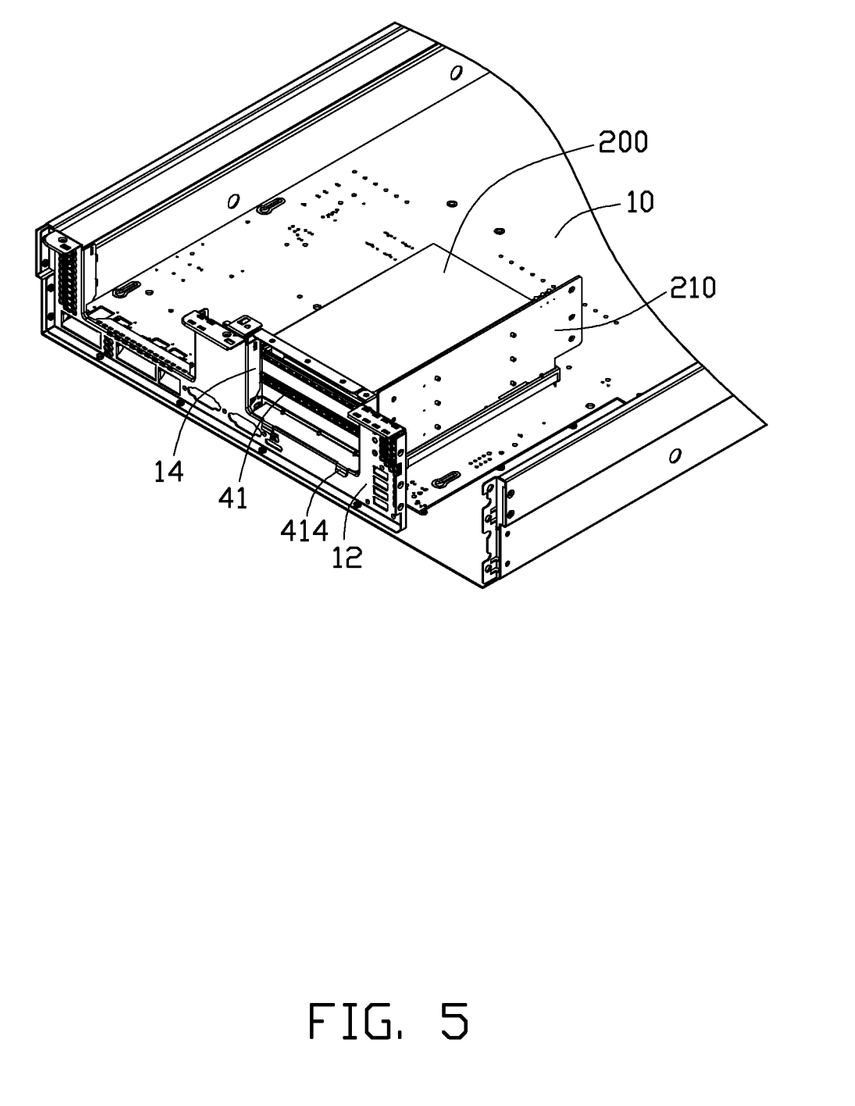
FIG. 5 is a schematic view of the peripheral component interconnect card fastening device of FIG. 1 viewed from another aspect.

Referring to FIGS. 2 and 4, the latching element 40 includes a main body 41, a sliding plate 42, a plurality of latching portions 43 and a plurality of joints 44. The latching element 40 further includes two sidewalls 411 protruding from opposite ends of the main body 41, and a supporting panel 412 protruding from an edge of the main body 41 between the sidewalls 411. Two spaced latching blocks 414 protrude from a distal end of the supporting panel 412 away from the main body 41. A gap 416 is defined between each sidewall 411 and the supporting panel 412. The sliding plate 42 protrudes from one of the sidewalls 411 away from the main body 41. The latching portions 43 protrude from the other sidewall 411 opposite to the sliding plate 42. Each latching portion 43 includes a first latching block 431 latched in one of the first latching grooves 23, and a second latching block 432 latched in one of the second latching grooves 24. The latching element 40 further includes an U-shaped mounting board 413 protruding from the end of main body 41 at which the latching portions 43 are located. The mounting board 413 surrounds the latching portions 43 and includes two opposite mounting sections 4131 and a connecting section 4132 connecting the mounting sections 4131. Each mounting section 4131 defines a latching hole 415 for latching with the locking element 60. The joints 44 are fixed to the connecting section 4132 and used as a hinge between the locking element 60 and the latching element 40. In this exemplary embodiment, each joint 44 is an arcuate arm defining an opening 441.

The locking element 60 is an L-shaped board, and includes a pressing board 61, a connecting board 62 perpendicularly protruding from the pressing board 61, and two opposite hooks 63. The pressing board 61 includes a pressing surface 611 facing away from the connecting board 62. The pressing surface 611 defines a plurality of receiving grooves 612 corresponding to the latching portions 43. The connecting board 62 defines a plurality of troughs 622 and includes a plurality of shafts 624. Each shaft 624 is located in one of the troughs 622. Each hook 63 protrudes from one end of the pressing board 61. Each hook 63 includes an extending arm 631 protruding from the pressing board 61, a pressing arm 632 protruding from a distal end of the extending arm 631 toward the other hook 63, and a securing block 633 protruding from a surface of the extending arm 631 opposite to the pressing arm 632.

Referring to FIGS. 1 and 5-8, in assembly, the shafts 624 are rotatably fixed to the openings 441 so the locking element 60 is rotatably fixed to the latching element 40. The first latching block 431 of the latching element 40 is latched in the first latching groove 23 and the second latching block 432 is latched in the second latching groove 24. The pressing arms 632 are pressed toward each other to cause the securing blocks 633 to move toward each other. The locking element 60 rotates relative to the latching element 40 around the shafts 624 to bring the securing blocks 633 into alignment with the latching holes 415. The pressing arms 632 are released so the securing blocks 633 moves into the latching holes 415 to lock the locking element 60 to the latching element 40. At this time, the latching portions 43 are received in the receiving grooves 612, the bending sections 22 are latched between the pressing board 61 and the sidewall 411 so the latching plate 20 is secured between the latching element 40 and the locking element 60. The motherboard 210 is inserted in the socket 111. The PCI cards 200 can then be latched to the motherboard 210 as follows: each support plate 14 is inserted in to one of the gaps 416; the sliding plate 42 is located in the sliding groove 16; the supporting panel 412 is supported on the resisting plate 15, and the latching blocks 414 are latched with the end wall 12 of the chassis 10.

Figure 6:
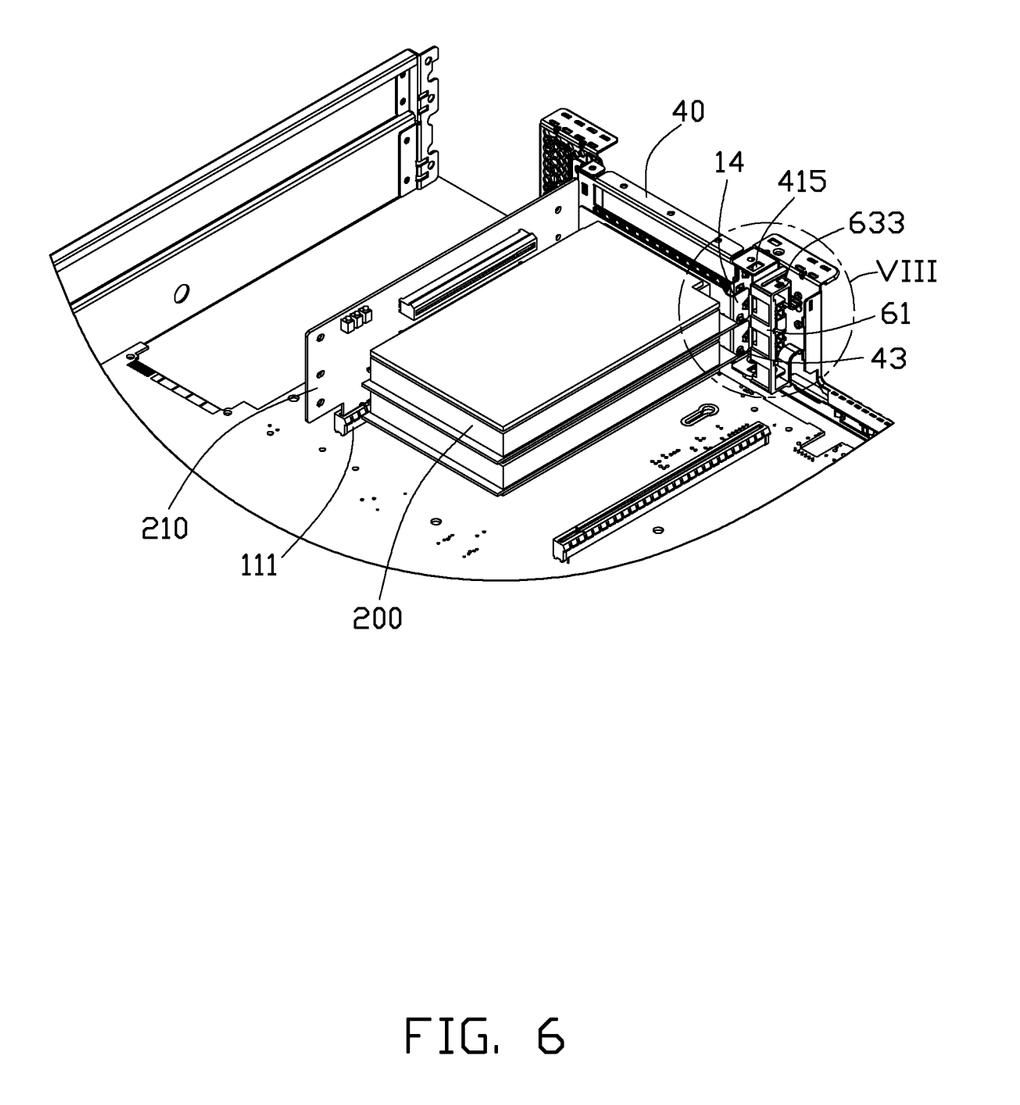
FIG. 6 is similar to FIG. 1, but showing a locking element opened.
Figure 7:
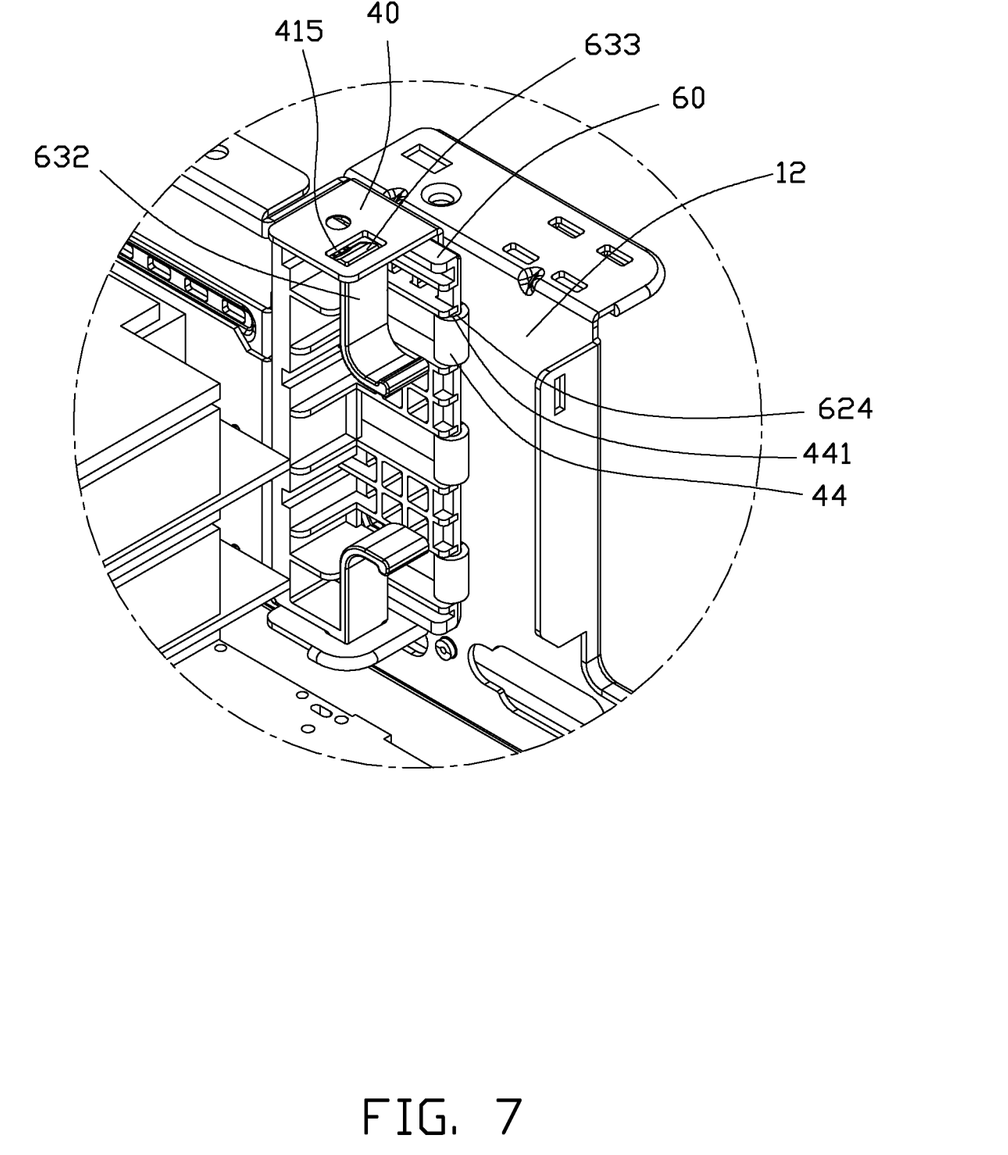
FIG. 7 is a partially enlarged view of the peripheral component interconnect fastening device of FIG. 1 within a circled line VII.
Figure 8:
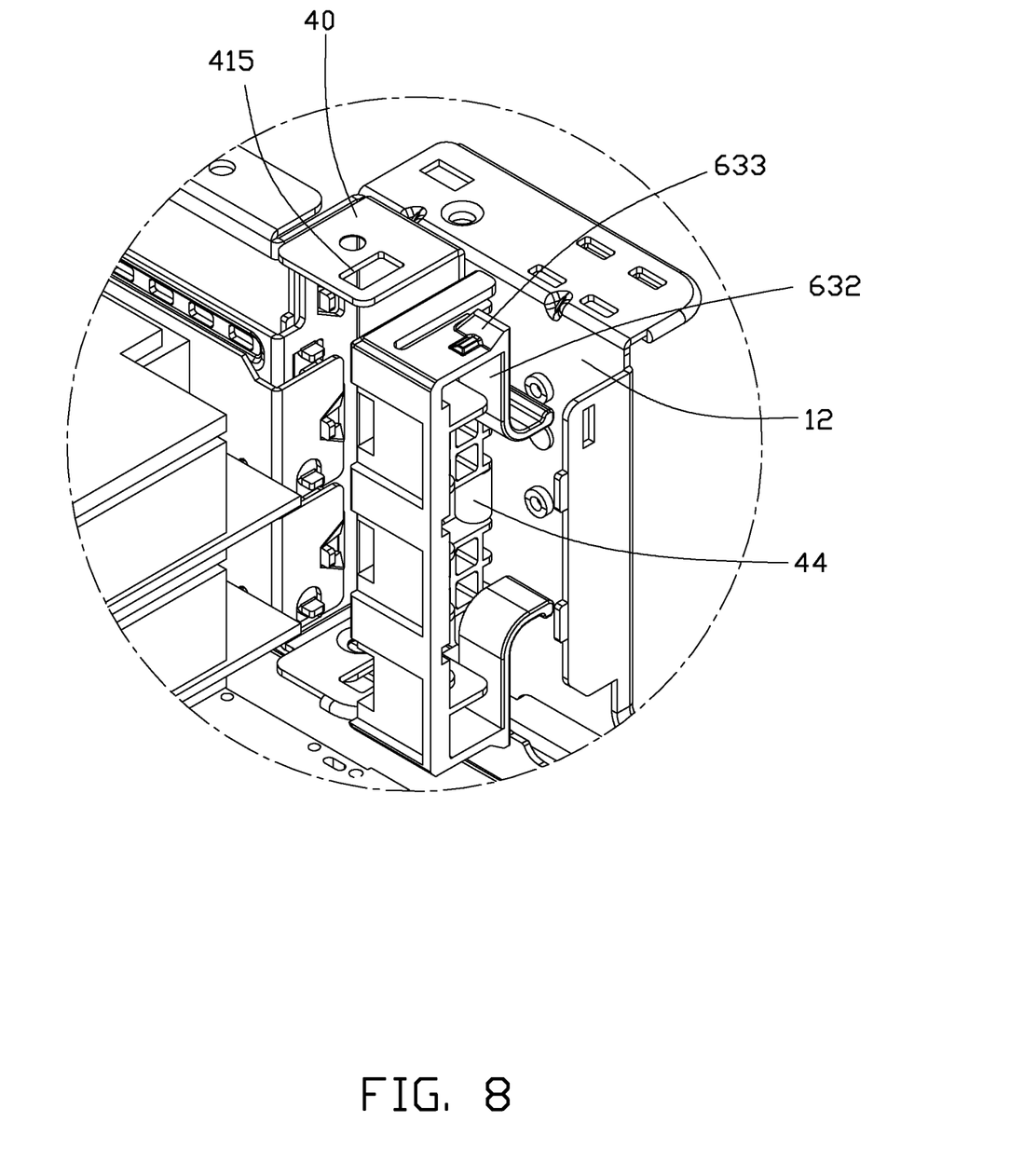
FIG. 8 is a partially enlarged view of the peripheral component interconnect fastening device of FIG. 1 within a circled line VIII.

Referring to FIGS. 6 and 8, to detach the PCI card 200 from the motherboard 210, the pressing arms 632 are pressed toward each other to cause the securing blocks 633 to move toward each other until the securing blocks 633 are released from the latching holes 415. The locking element 60 rotates relative to the latching element 40 around the shafts 624 to move the pressing board 61 away from the latching element 40 so the bending sections 22 are released. The first latching block 431 is released from the first latching groove 23 and the second latching block 432 is released from the second latching groove 24, thereupon the PCI card 200 is ready for detachment from the mother board.

It is to be further understood that even though numerous characteristics and advantages of the exemplary embodiments have been set forth in the foregoing description, together with details of structures and functions of various embodiments, the disclosure is illustrative only, and changes may be made in detail, especially in the matters of shape, size, and arrangement of parts within the principles of the exemplary invention to the full extent indicated by the broad general meaning of the terms in which the appended claims are expressed.

What is claimed is:

1. A PCI card fastening device for fastening a PCI card to a chassis, the PCI card fastening device comprising:
   a latching plate fixed to the PCI card;
   a latching element slidably fixed to the chassis, the latching element including a main body, a latching portion protruding from an end of the main body, and a U-shaped mounting board protruding from the end of the main body and surrounding the latching portion, the mounting board comprising two opposite mounting sections and a connecting section connecting the mounting sections, each mounting section defining a latching hole;
   a locking element rotatably fixed to the latching element, the locking element including a pressing board and two hooks protruding from the pressing board, each hook including a pressing arm and a securing block;
   wherein the latching plate is latched to the latching portion, the securing block of each hook is latched in one of the latching holes to latch the locking element to the latching element so the latching plate is latched between the pressing board and the latching element to latch the PCI card to the chassis; after the pressing arm is pressed to cause the securing blocks to be released from the latching holes, the pressing board rotates relative to the latching element, allowing the latching plate to be released from the latching portion to detach the PCI card from the chassis.

2. The PCI card fastening device of claim 1, wherein the latching plate is substantially L-shaped, and includes a latching section and a bending section bending from the latching section, the latching section is latched with the PCI card, the bending section is latched between the pressing arm and the latching element when the securing blocks are latched in the latching holes.

3. The PCI card fastening device of claim 2, wherein the bending section defines a first latching groove and a second latching groove perpendicular to the first latching groove; the latching portion includes a first latching block latched in the first latching groove, and a second latching block latched in the second latching groove.

4. The PCI card fastening device of claim 3, wherein the latching element further includes a joint fixed to the connecting section, the locking element includes a shaft rotatably fixed to the joint so the locking element can rotate relative to the latching element.

5. The PCI card fastening device of claim 4, wherein the joint is an arcuate arm defining an opening, in which the shaft is rotatably fixed.

6. The PCI card fastening device of claim 5, wherein the pressing board includes a pressing surface defining a receiving groove corresponding to the latching portion, the latching portion is received in the receiving groove when the securing blocks are latched in the latching holes.

7. The PCI card fastening device of claim 1, wherein each hook further includes an extending arm protruding from the pressing board, the pressing arm protruding from a distal end of the extending arm toward the other hook; the securing block protruding from a surface of the extending arm opposite to the pressing arm.

8. The PCI card fastening device of claim 4, wherein the locking element further comprises a connecting board perpendicularly protruding from the pressing board, the connecting board defines a trough; the shaft is located in the trough.

9. A PCI card fastening device for fastening a PCI card to a chassis, the PCI card fastening device comprising:
   a latching plate fixed to the PCI card;
   a latching element slidably fixed to the chassis, the latching element including a main body, a latching portion protruding from an end of the main body, and a U-shaped mounting board protruding from the end of the main body and surrounding the latching portion, the mounting board comprising two opposite mounting sections and a connecting section connecting the mounting sections, each mounting section defining a latching hole;
   a locking element rotatably fixed to the latching element, the locking element including a pressing board and two hooks protruding from the pressing board, each hook including a pressing arm and a securing block;
   wherein the latching plate is latched to the latching portion, the securing block of each hook is latched in one of the latching holes to latch the locking element to the latching element so the latching plate is latched between the pressing board and the latching element to latch the PCI card to the chassis; after the securing blocks are released from the latching holes, the pressing board moves away from the latching element to release the latching plate between the pressing board and the latching element.

10. The PCI card fastening device of claim 9, wherein the latching plate is substantially L-shaped, includes a latching section and a bending section bending from the latching section, the latching section is latched with the PCI card, the bending section is latched between the pressing arm and the latching element when the securing blocks are latched in the latching holes.

11. The PCI card fastening device of claim 10, wherein the bending section defines a first latching groove and a second latching groove perpendicular to the first latching groove; the latching portion includes a first latching block latched in the first latching groove, and a second latching block latched in the second latching groove.

12. The PCI card fastening device of claim 11, wherein the latching element further includes a joint fixed to the connecting section, the locking element includes a shaft rotatably fixed to the joint so the locking element can rotate relative to the latching element.

13. The PCI card fastening device of claim 12 wherein the joint is an arcuate arm defining an opening, in which the shaft is rotatably fixed.

14. The PCI card fastening device of claim 13, wherein the pressing board includes a pressing surface defining a receiving groove corresponding to the latching portion, the latching portion is received in the receiving groove when the securing blocks are latched in the latching.

15. The PCI card fastening device of claim 9, wherein each hook further includes an extending arm protruding from the pressing board and a pressing arm protruding from a distal end of the extending arm toward the other hook; the securing block protruding from a surface of the extending arm opposite to the pressing arm.

16. The PCI card fastening device of claim 12, wherein the locking element further comprises a connecting board perpendicularly protruding from the pressing board, the connecting board defines a trough; the shaft is located in the trough.

* * * * *